United States Patent
Joyce et al.

(10) Patent No.: US 6,244,755 B1
(45) Date of Patent: Jun. 12, 2001

(54) METHOD FOR ALIGNING THE OPTICAL FIBER AND LASER OF FIBER-OPTIC LASER MODULES

(75) Inventors: William Baxter Joyce, Basking Ridge, NJ (US); Daniel Paul Wilt, Orefield, PA (US)

(73) Assignee: Lucent Technologies Inc., Moutainside, NJ (US)

( * ) Notice: Subject to any disclaimer, the term of this patent is extended or adjusted under 35 U.S.C. 154(b) by 0 days.

(21) Appl. No.: 09/199,092

(22) Filed: Nov. 24, 1998

(51) Int. Cl.[7] ................................................. G02B 6/36
(52) U.S. Cl. ................................................. 385/90; 385/52
(58) Field of Search ................................ 385/90, 91, 15, 385/52, 88; 250/227.14, 227.15, 227.16, 227.24

(56) References Cited

U.S. PATENT DOCUMENTS 5,572,614 * 11/1996 Lucas, Jr. ............................ 385/91
5,963,695 * 10/1999 Joyce ................................... 385/88

* cited by examiner

Primary Examiner—John D. Lee
Assistant Examiner—Michelle R. Connelly-Cushwa
(74) Attorney, Agent, or Firm—Jean-Marc Zimmerman

(57) ABSTRACT

A method for maximizing the coupling efficiency of a fabricated fiber-optic laser module by deforming the module. In a first embodiment, the method can use a plurality of previously determined influence coefficients to determine how to deform the module, wherein such deformation aligns the focal point of the optical fiber and the laser to maximize the coupling efficiency. Alternatively, in a second embodiment of the present invention, the method is implemented without the use of influence coefficients, wherein the changes in the coupling efficiency resulting from deforming the module are observed to determine which deformations will maximize the coupling efficiency. Irrespective of which embodiment of the present invention is used, the module is deformed to account for its elastic properties by deforming the module beyond the final shape it attains when the coupling efficiency is maximized.

21 Claims, 2 Drawing Sheets

METHOD FOR ALIGNING THE OPTICAL FIBER AND LASER OF FIBER-OPTIC LASER MODULES

FIELD OF THE INVENTION

This invention relates to methods for aligning optical fibers and lasers, and more particularly to a method for aligning the optical fiber and laser of a fabricated laser module to maximize its coupling efficiency, i.e., optical throughput.

BACKGROUND OF THE INVENTION

Conventional methods employed to fabricate fiber-optic laser modules typically align the focal point of the optical fiber and the laser for maximum coupling efficiency as an intermediate fabrication step performed before the module is completely fabricated. However, such methods suffer from a significant drawback since the fiber-laser alignment can be disturbed by subsequent fabrication steps and post-fabrication certification tests, such as sealing the lid and burn-in, respectively, which can adversely effect the coupling efficiency of the laser module.

It is, therefore, an object of the present invention to overcome the foregoing drawback of conventional fabrication methods by providing an improved method for aligning the optical fiber and laser of a laser module to maximize its coupling efficiency.

SUMMARY OF THE INVENTION

A method for aligning the focal point of the optical fiber and laser of a fabricated laser module to maximize coupling efficiency by deforming the module by a known amount The method can use a plurality of previously determined influence coefficients to determine how to deform the laser module to maximize the coupling efficiency. Alternatively, the method can use the changes in the coupling efficiency resulting from deforming the module to determine how the module should be deformed to maximize the coupling efficiency. The module is deformed to account for its elastic properties by deforming it beyond the final shape it attains when the coupling efficiency is maximized.

DETAILED DESCRIPTION OF THE INVENTION

Figure 1:
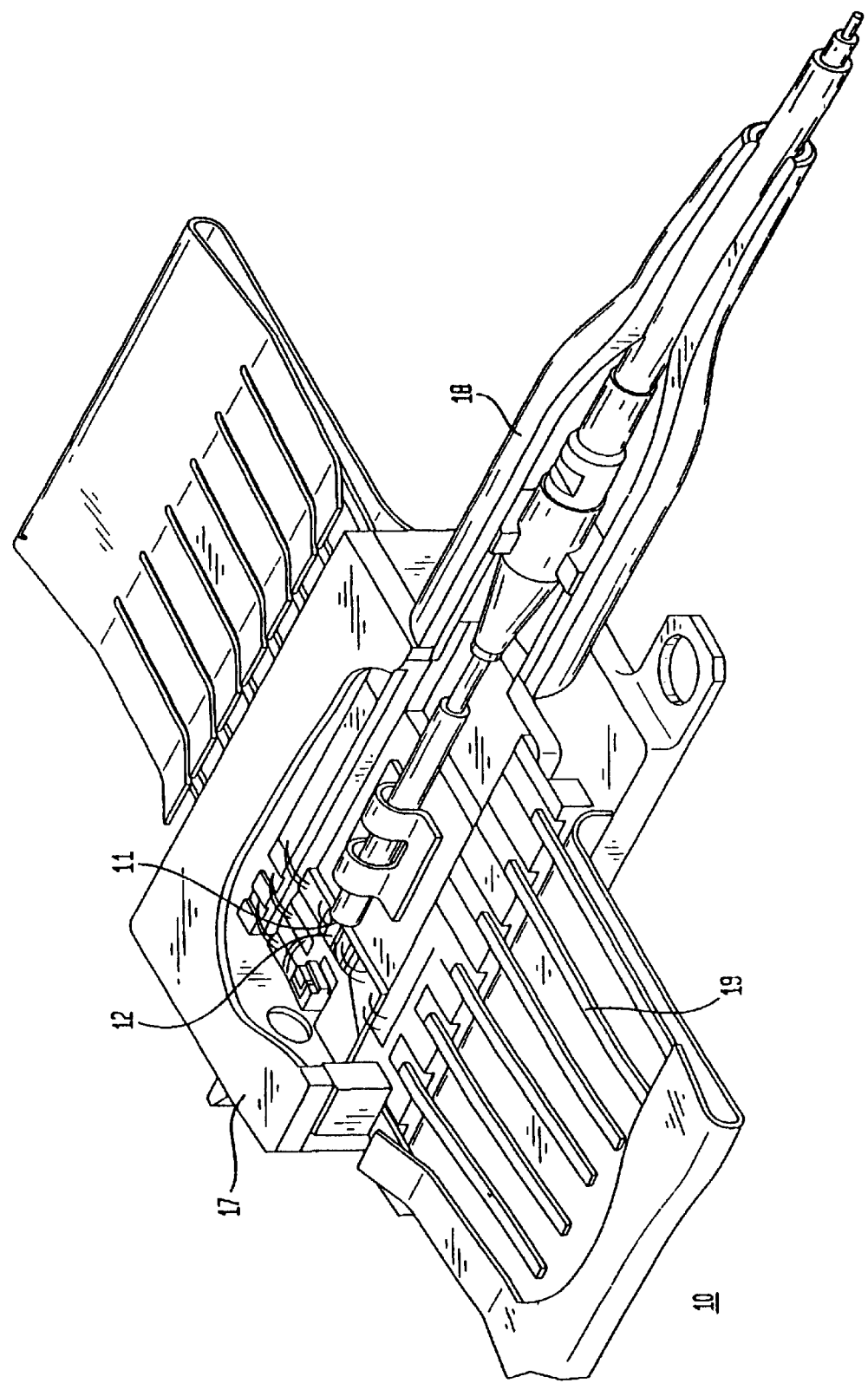
FIG. 1 shows a conventional fiber-optic laser module whose optical fiber and laser can be aligned for maximum coupling efficiency using the method of the present invention.

Referring to FIG. 1 there is shown a conventional fiber-optic laser module whose optical fiber focal point 11 and laser 12 can be aligned using the method of the present invention. This method is employed after laser module 10 has been completely fabricated, and either before or after all certification tests, such as thermal cycling, have been performed so that the alignment is not subsequently degraded by such tests.

In a first embodiment of the present invention, the method is used by first determining a plurality of influence coefficients for fiber-optic laser module 10. The influence coefficients are the ratios of module deformation to focal point motion. Such coefficients are determined by deforming laser module 10 in a controlled manner by a known displacement and observing the resulting change in the coupling efficiency of module 10. These coefficients can be measured either directly by cutting an inspection hole in laser module 10 and using a microscope to observe the movement of the focal point of fiber tip 11 as laser module 10 is deformed, or alternatively by using finite element analysis (FEA) to simulate such direct measurement This deformation can be either static or dynamic in nature.

The influence coefficients for laser module 10 are determined by correlating each change in displacement of the focal point of fiber tip 11 with a resulting change in the coupling efficiency. Each different deformation of laser module 10 results in a different influence coefficient While such coefficients differ for each different laser module design, they are nearly identical for each separate laser module of the same design. The influence coefficients are typically used when this method is implemented as an automated step in the fabrication process.

Figure 2:
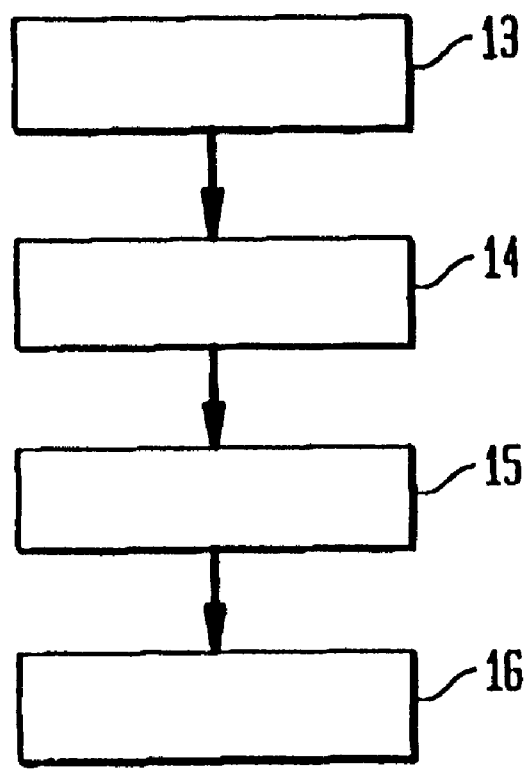
FIG. 2 shows a flowchart of an exemplary embodiment of the method for maximizing the coupling efficiency of fabricated fiber-optic laser modules according to this invention.

As shown in flowchart form in FIG. 2, the method of the present invention operates as follows. At step 13, the influence coefficients for laser module 10 are determined. At step 14, the coupling efficiency of fabricated laser module 10 is measured for a particular current input to the module 10. At step 15, using the previously determined influence coefficients, laser module 10 is plastically deformed in a controlled manner by a known displacement to align the focal point of optical fiber 11 and laser 12 for maximum coupling efficiency.

Finally, at step 16, the coupling efficiency of laser module 10 is measured again to determine if the deformation succeeded in realigning the fiber relative to the laser to maximize the coupling efficiency. If the coupling efficiency is determined to be within a predetermined range of acceptable maximum measurement, then laser module 10 can be used. If, however, the coupling efficiency is not within this predetermined range of acceptable maximum measurement, then laser module 10 can not be used and the module is either deformed again until the coupling efficiency is acceptable, or it is discarded.

In a second embodiment of the present invention, the method is used without the use of influence coefficients, wherein changes in the coupling efficiency resulting from deforming module 10 are observed to determine which deformations maximize the coupling efficiency. This embodiment of the present invention is used when the method is implemented as a manual step in the fabrication process. Irrespective of which embodiment of the present invention is used, module 10 is deformed to account for its elastic properties by deforming module 10 beyond the final shape it will attain when the coupling efficiency is maximized.

Laser module 10 is deformed using the present method by applying torsioning and/or flexing forces to either the case 17, snout 18 or legs 19 of the module 10. However, since the snout 18 and legs 19 are relatively fragile and can be damaged by the application of such forces, it is preferable to deform the case 17. Also, laser module 10 is plastically, rather than elastically, deformed since the application of forces is intended to effect a permanent change in the position of the focal point of fiber tip 11 relative to laser 12. The method of the present invention can be implemented by deforming laser module 10 in one (x), two (x and y), or three (x, y and z) planes of movement.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A method for maximizing the coupling efficiency of a fabricated fiber-optic laser module, comprising the steps of:

determining a first coupling efficiency for a laser module;

determining a plurality of influence coefficients for the laser module;

deforming the laser module to align the focal point of the optical fiber and the laser to maximize the coupling efficiency of the laser module, wherein the plurality of influence coefficients are used to determine how to deform the laser module; and determining a second coupling efficiency, wherein if this second coupling efficiency is within a predetermined specification the laser module can be used.

2. The method according to claim 1, wherein the laser module is deformed to account for its elastic properties by deforming the laser module beyond the shape it attains when the coupling efficiency is maximized.

3. The method according to claim 1, wherein the laser module is repeatedly deformed until a coupling efficiency is achieved within the predetermined specification.

4. The method according to claim 1, wherein the laser module is deformed in one plane of movement.

5. The method according to claim 1, wherein the laser module is deformed in two planes of movement.

6. The method according to claim 1, wherein the laser module is deformed in three planes of movement.

7. The method according to claim 1, wherein the laser module is plastically deformed.

8. The method according to claim 7, wherein the deformation is static in nature.

9. The method according to claim 7, wherein the deformation is dynamic in nature.

10. The method according to claim 1, wherein the module includes a case and a snout.

11. The method according to claim 10, wherein the module is deformed by torsioning the case.

12. The method according to claim 10, wherein the module is deformed by flexing the case.

13. The method according to claim 10, wherein the module is deformed by torsioning the snout.

14. The method according to claim 10, wherein the module is deformed by flexing the snout.

15. A method for aligning the focal point of the optical fiber and laser of a fabricated laser module to maximize the coupling efficiency of the laser module, comprising the steps of:

determining a first coupling efficiency for a laser module;

deforming the laser module to align the focal point of the optical fiber and the laser to maximize the coupling efficiency of the laser module, wherein the laser module is deformed to account for its elastic properties by deforming the laser module beyond the final shape it attains when the coupling efficiency is maximized; and determining a second coupling efficiency, wherein if this second coupling efficiency is within a predetermined specification the laser module can be used.

16. The method according to claim 15, wherein the laser module is repeatedly deformed until a coupling efficiency is achieved within the predetermined specification.

17. The method according to claim 15, wherein the laser module is deformed in one plane of movement.

18. The method according to claim 15, wherein the laser module is deformed in two planes of movement.

19. The method according to claim 15, wherein the laser module is plastically deformed.

20. The method according to claim 19, wherein the module includes a case and the module is deformed by torsioning the case.

21. The method according to claim 19, wherein the module includes a case and the module is deformed by flexing the case.

* * * * *